United States Patent
Sigal et al.

(10) Patent No.: US 10,021,530 B2
(45) Date of Patent: Jul. 10, 2018

(54) OCCUPANCY SYSTEM AND METHOD FOR DETECTING PRESENCE OF INDIVIDUALS IN A PLURALITY OF DEFINED AREAS OR ROOMS

(71) Applicant: TOME, INC., Royal Oak, MI (US)

(72) Inventors: Jacob R. Sigal, Ferndale, MI (US); Massimo Baldini, Beverly Hills, MI (US); Eric Christoper Barch, Oxford, MI (US)

(73) Assignee: TOME, Inc., Royal Oak, MI (US)

( * ) Notice: Subject to any disclaimer, the term of this patent is extended or adjusted under 35 U.S.C. 154(b) by 0 days.

(21) Appl. No.: 15/204,416

(22) Filed: Jul. 7, 2016

(65) Prior Publication Data
US 2017/0013415 A1    Jan. 12, 2017

Related U.S. Application Data

(60) Provisional application No. 62/189,558, filed on Jul. 7, 2015.

(51) Int. Cl.
    *H04W 4/00*    (2018.01)
    *H04W 8/00*    (2009.01)
    *H04W 4/04*    (2009.01)
    *H04L 29/08*   (2006.01)

(52) U.S. Cl.
    CPC .......... *H04W 4/043* (2013.01); *H04L 67/24* (2013.01); *H04W 8/005* (2013.01)

(58) Field of Classification Search
    CPC ..... H04W 4/043; H04W 8/005; H04W 84/12; H04W 4/02; H04W 64/00; H04L 67/10; H04L 29/08657; G01S 5/02; G01S 5/14; B60R 25/104; B60R 25/2009; B60R 25/30; B60R 25/102; G08B 13/00; G08B 13/2497; G08B 25/00; G08B 25/008; G08B 25/009; G08B 25/10; H04M 11/04
    USPC .............................................. 455/456.1–457
    See application file for complete search history.

(56) References Cited

U.S. PATENT DOCUMENTS

| | | | |
|---|---|---|---|
| 6,505,804 B1 * | 1/2003 | Francis ................. | A47C 9/022 248/424 |
| 7,554,437 B2 | 6/2009 | Axelsen | |
| 8,743,198 B2 | 6/2014 | Padmanabh et al. | |
| 2002/0043843 A1 * | 4/2002 | Pennington ............ | A47C 1/023 297/301.1 |
| 2005/0093690 A1 * | 5/2005 | Miglionico .............. | G01G 3/12 340/539.1 |

(Continued)

*Primary Examiner* — Sharad Rampuria
(74) *Attorney, Agent, or Firm* — Stephen T. Olson; Harness, Dickey & Pierce, P.L.C.

(57) ABSTRACT

The present disclosure relates to a system for monitoring occupancy of one or more pre-defined areas. The system has a scanning subsystem for wirelessly scanning a pre-defined area, using a short range wireless communications protocol, to detect a presence of one or more wireless personal electronic devices (PEDs) associated with one or more individuals present in the pre-defined area. Each of the PEDs also use the short range wireless communications protocol to radiate wireless signals that are detected by the scanning subsystem. A data analysis/processing subsystem analyzes data generated by the scanning subsystem relating to detected PEDs in the pre-defined area. A notification subsystem analyzes the information relating to an occupancy level of the pre-defined area.

17 Claims, 9 Drawing Sheets

(56) References Cited

U.S. PATENT DOCUMENTS

| | | | |
|---|---|---|---|
| 2008/0079569 A1* | 4/2008 | Axelsen | G06Q 10/10 340/541 |
| 2011/0157366 A1* | 6/2011 | Padmanabh | H04N 7/15 348/159 |
| 2011/0272200 A1* | 11/2011 | Clapp | A61G 1/017 180/54.1 |
| 2014/0335897 A1* | 11/2014 | Clem | G08G 1/0112 455/456.3 |
| 2016/0088438 A1* | 3/2016 | O'Keeffe | H04R 27/00 455/456.2 |
| 2017/0318147 A1* | 11/2017 | Merjanian | H04M 1/72538 |

* cited by examiner

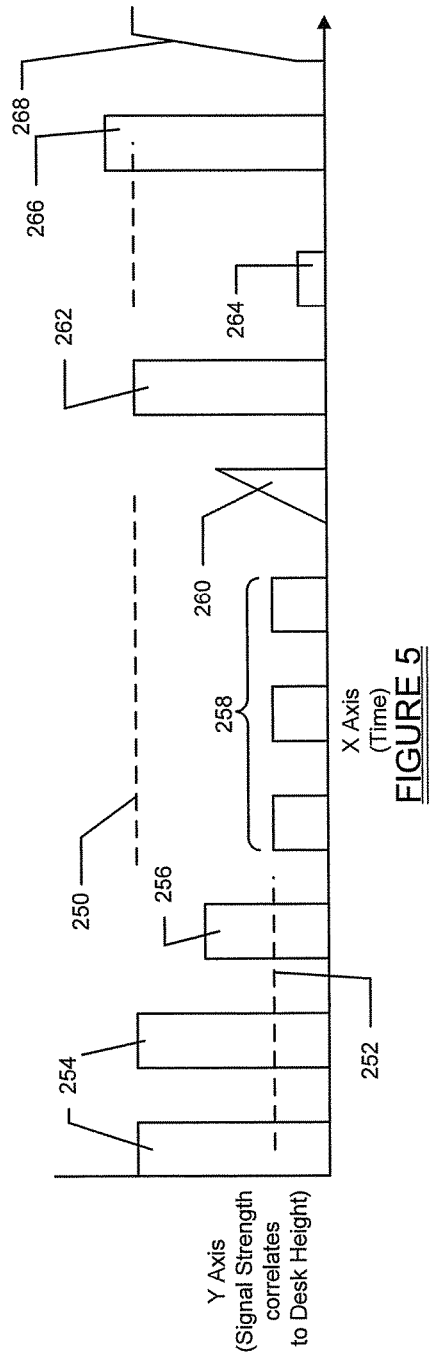
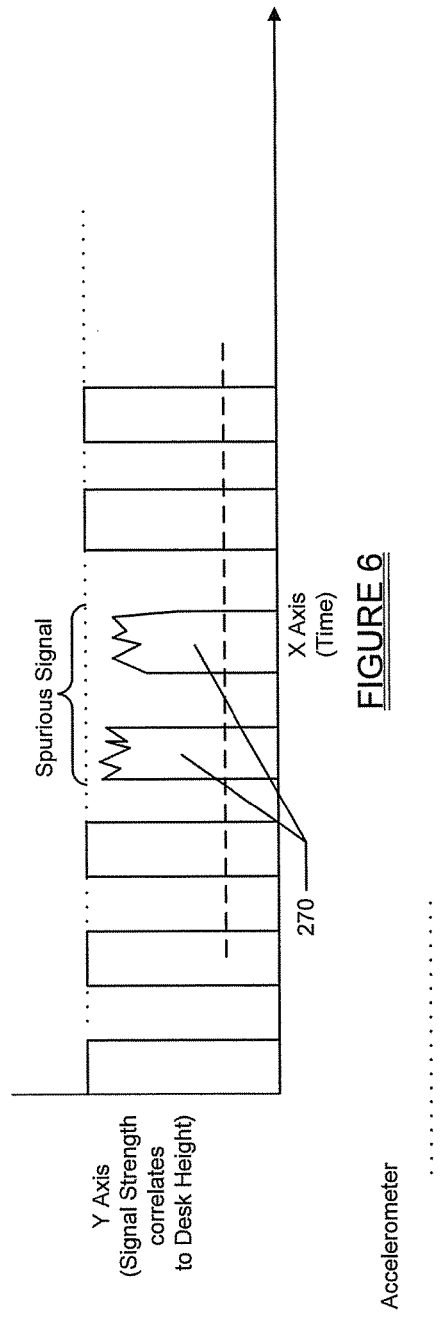

OCCUPANCY SYSTEM AND METHOD FOR DETECTING PRESENCE OF INDIVIDUALS IN A PLURALITY OF DEFINED AREAS OR ROOMS

CROSS-REFERENCE TO RELATED APPLICATIONS

This application claims the benefit of U.S. Provisional Application No. 62/189,558, filed on Jul. 7, 2015. The entire disclosure of the above application is incorporated herein by reference.

FIELD

The present disclosure relates to systems and methods for detecting the occupancy of predefined areas such as offices and conference rooms, and more particularly to a system and method for detecting the presence of individuals in such spaces based on the reception of wireless broadcasts from personal electronic devices being carried by the individuals, and for providing near real time information to the individuals of the occupancy of various rooms or areas of a building, or rooms or areas of multiple buildings in a campus like environment.

BACKGROUND

The statements in this section merely provide background information related to the present disclosure and may not constitute prior art.

Presently there is a growing interest in making more efficient use of conference rooms, offices, and other spaces within work place environments such as office buildings and technical center buildings. Often it is impossible or difficult to track, in real time, the actual usage of such areas within an building. This may result in a relatively small group of individuals making use of a large conference room when a smaller conference room, at a different location within the same building, is available for use. Another situation that occurs is where a conference being held in a conference room ends early (i.e., before the end of a reserved time slot), but this information is not made available to others within the building who may be looking for a conference room to use. Still another example is where a group of individuals begin making use of a conference room without having reserved the use of the conference beforehand with the appropriate person/department. A subsequent group of individuals may reserve the same conference room and then travel to the conference room only to find that it is already occupied.

The same drawbacks apply to buildings where workers do not have an assigned office space, but instead seek out an open cubicle or office. Such workers may be those who primarily work out of their homes, and occasionally (maybe once or twice weekly) come into the office for short periods of time to do work. Often such workers may not know where the nearest "open" office or cubicle is. Some real time occupancy detection/monitoring system could provide real time information to these workers which help them to quickly identify the closest available office, cubicle or work area where they can set up their laptop, tablet, etc., and begin work.

Still other areas where real time occupancy detection is lacking is in the usage of other facilities such as auditoriums, cafeterias, etc. In some buildings, workers may have a significant walk to a cafeteria, only to find out that the cafeteria is at or near maximum occupancy. If a given worker had known this beforehand, she/may have delayed a visit to the cafeteria for a short time, maybe 30 minutes or so, until the cafeteria was not so busy. Likewise, a worker working in a large office building may not be aware that a seminar being given in an auditorium is filled to capacity, and may walk a good distance to the auditorium only to learn of this fact. Having this type of information available, in real time, to each individual present within the building would help to maximize the utilization of all available meeting spaces within the building. This type of occupancy information would also likely help increase productivity of workers by providing immediate, real time information to workers within a building which rooms are occupied and which are not, and thus eliminating instances where a group of workers must spend time trying to find an occupied room for a meeting which is suitable for the number of individuals in the group.

SUMMARY

This section provides a general summary of the disclosure, and is not a comprehensive disclosure of its full scope or all of its features.

In one aspect the present disclosure relates to a system for monitoring occupancy of one or more pre-defined areas. The system may comprise a scanning subsystem for wirelessly scanning a pre-defined area, using a short range wireless communications protocol, to detect a presence of one or more wireless personal electronic devices (PEDs) associated with one or more individuals present in the pre-defined area. Each of the PEDs also use the short range wireless communications protocol to radiate wireless signals that are detected by the scanning subsystem. A data analysis/processing subsystem may be included for analyzing data generated by the scanning subsystem relating to detected PEDs in the pre-defined area. A notification subsystem may be included for analyzing the information relating to an occupancy level of the pre-defined area.

In another aspect the present disclosure relates to a system for monitoring occupancy of a plurality of pre-defined areas. The system may comprise a scanning subsystem for wirelessly scanning each of the pre-defined areas, using a short range wireless communications protocol, to detect a presence of one or more wireless personal electronic devices (PEDs) associated with one or more individuals present in each of the pre-defined areas. Each of the PEDs also uses the short range wireless communications protocol to radiate wireless signals that are detected by the scanning subsystem. A cloud based data analysis/processing subsystem is included for analyzing data received wirelessly from the scanning subsystem relating to detected PEDs in the pre-defined areas. A local area network (LAN) may be included which is in communication with the scanning subsystem. The LAN assists in providing the data to the cloud based data analysis/processing subsystem. A notification subsystem may also be included for analyzing the information relating to an occupancy level in each one of the pre-defined areas.

In still another aspect the present disclosure relates to a method for monitoring occupancy of one or more pre-defined areas. The method may comprise using a scanning subsystem to wirelessly scan a pre-defined area. The scanning subsystem may use a short range wireless communications protocol to detect a presence of one or more wireless personal electronic devices (PEDs) associated with one or more individuals present in the pre-defined area. Each of the PEDs may also use the short range wireless communications protocol to radiate wireless signals that are detected by the scanning subsystem. The method also may involve using a data analysis/processing subsystem to analyze data generated by the scanning subsystem relating to detected PEDs in the pre-defined area. The method may further include using a notification subsystem to analyze the information relating to an occupancy level of the pre-defined area.

Further areas of applicability will become apparent from the description provided herein. The description and specific examples in this summary are intended for purposes of illustration only and are not intended to limit the scope of the present disclosure.

BRIEF DESCRIPTION OF THE DRAWINGS

The drawings described herein are for illustration purposes only and are not intended to limit the scope of the present disclosure in any way.

FIG. 5 shows examples of waveform characteristics that may be analyzed by the signal processing subsystems and algorithms of the present disclosure, to detect a potentially blocked or malfunctioning sensor system;

FIG. 6 shows another waveform which illustrates a spurious signal that the signal processing subsystems may interpret is a condition where a sensor may be at least partially blocked, or which indicate some type of obstacle placed to interfere with a sensing beam of one of the sensors;

DETAILED DESCRIPTION

Figure 1:
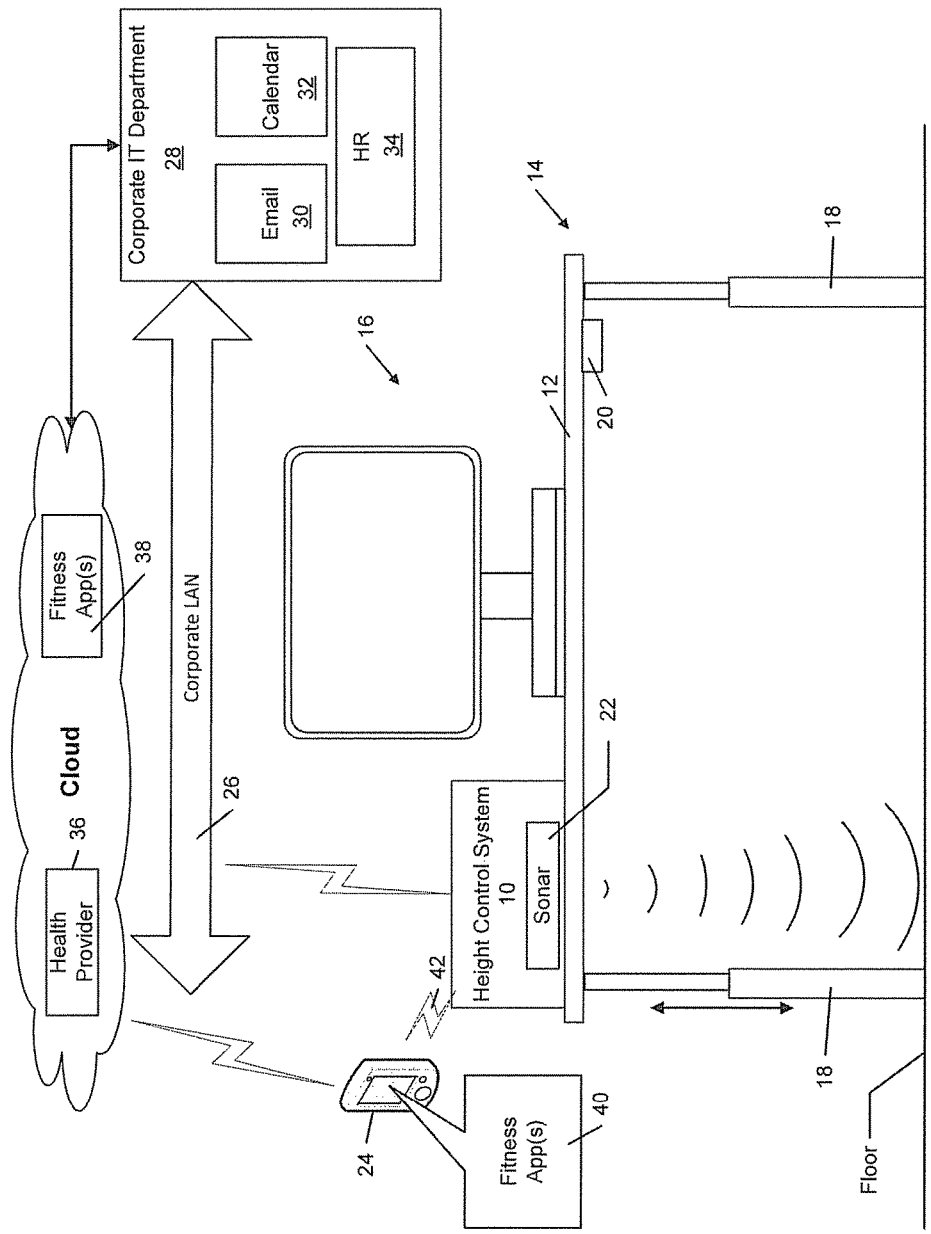
FIG. 1 is a high level illustration of one embodiment of a system in accordance with the present disclosure for enabling quick, accurate adjustments of the height of a work desk.

The following description is merely exemplary in nature and is not intended to limit the present disclosure, application, or uses. It should be understood that throughout the drawings, corresponding reference numerals indicate like or corresponding parts and features.

Referring to FIG. 1, there is shown a height adjust system 10 in accordance with one embodiment of the present disclosure. The height adjust system 10 (hereinafter simply "system 10") may be positioned on a desk surface 12 of a desk 14, or possibly underneath the desk surface 12 or alongside the desk surface 12. It is only important that the system 10 be mounted so that it moves with the desk surface 12. Alternatively, it is possible that a sensor component of the system 10, to be described momentarily, may be physically attached somewhere to the desk surface 12, while the remainder of the system 10 is positioned on a stationary panel or leg portion of the desk 14, or possibly on the ground adjacent the desk 14.

The desk surface 12, in one embodiment, is used to support a computer system 16 or other form of personal electronic device that the user needs to use. Accordingly, the desk 14 may be used to support a laptop, a table or any other type of computing device and is not limited to use with a desktop computer. However, as will be appreciated from the following discussion, the system 10 is not limited to use in office or home environments with computing devices. The system 10 can be used in connection with assembly tables or any other desk/table like structure used in a factory setting where setting two or more user adjustable heights would enhance the convenience, productivity and/or comfort to the user while performing the same tasks or performing different tasks at the desk/table like structure. It is also possible that the system 10 could be employed in connection with shelving systems used in warehouses to store goods that employees need to access frequently.

The desk 14 may be constructed to have a plurality of legs 18 that have a telescoping construction, along with a user control 20 that releases a locking mechanism and allows the user to manually raise and lower the desk surface 12. Alternatively, the desk surface 12 may be raised and lowered by an electric motor, with control 20 allowing up or down travel of the desk surface 12. The system 10 is not limited to use with any particular type of desk (i.e., manually adjustable height or motor driven height control). It is a principal feature of the system 10 that it can be used with desks having either a manually adjustable height or a motor driven height adjusting system. It is also a significant feature of the system 10 that it can be easily retrofitted to either style of desk with no modifications being required to the desk itself. And it will be appreciated that the system 10 could be used with an independent adjustable-height platform, that rests on an otherwise fixed height desk. In such an embodiment the system 10 would be sensing the height from either the fixed upper surface of the desk, to a riser or platform that is raisable and lowerable by the user, or alternatively from the floor surface to the riser or platform.

The system 10 makes use of a wireless sensor 22, in one embodiment a sonar sensor 22, for real time sensing of the height of the desk surface 12 relative to a floor on which the desk is supported, or alternatively relative to a fixed height desk surface on which is supported an adjustable height platform or riser. For the purpose of discussion, the example where an adjustable height desk will be used. The system 10 may communicate via a short range wireless link, such as a Bluetooth® protocol signal link, a ZigBee® protocol wireless link, or any other suitable form of wireless near field communication link, with the user's smartphone 24. The system 10 may also communicate via a short range wireless link (e.g., Bluetooth® protocol link, ZigBee® protocol link, etc.) with a corporate LAN 26. A corporate IT department 28 where servers are present for managing the email accounts 30 and calendars 32. A human resources (HR) department 34 may be in communication with the email accounts 30 and the calendars 32. The corporate IT department may also be in communication with one or more cloud-based services, for example a health provider 36 and/or one or more personal or corporate wellness fitness applications 38.

The user's smartphone 24 may also optionally contain one or more fitness applications 40 stored thereon, or otherwise may access the one or more cloud-based fitness applications 38. The smartphone 24 also may be used to identify the user to the system 10 via the short range wireless signal link 42 (e.g., Bluetooth® protocol, ZigBee® protocol link or other type of link) established between the smartphone 24 and the system 10.

The system 10 allows the user to quickly raise and lower the desk surface 12, either manually or with the assistance of a motor driven lift mechanism, to a precise, previously set height, and to provide the user with a signal when the desk surface is at the previously set height. The system 10 also enables multiple users who have their own preset heights saved in the system 10 to use the system without the need for entering an identification parameter. The system 10 may automatically identify the user based on the wireless connection with the user's smartphone, and then may automatically notify the user when his/her preset desk height is reached as the user raises or lowers the desk surface 12. This facilitates highly convenient use of a desk that needs to be shared by two or more individuals, and where the different individual will want to use the desk 14 in both standing and seated positions.

Figure 2:
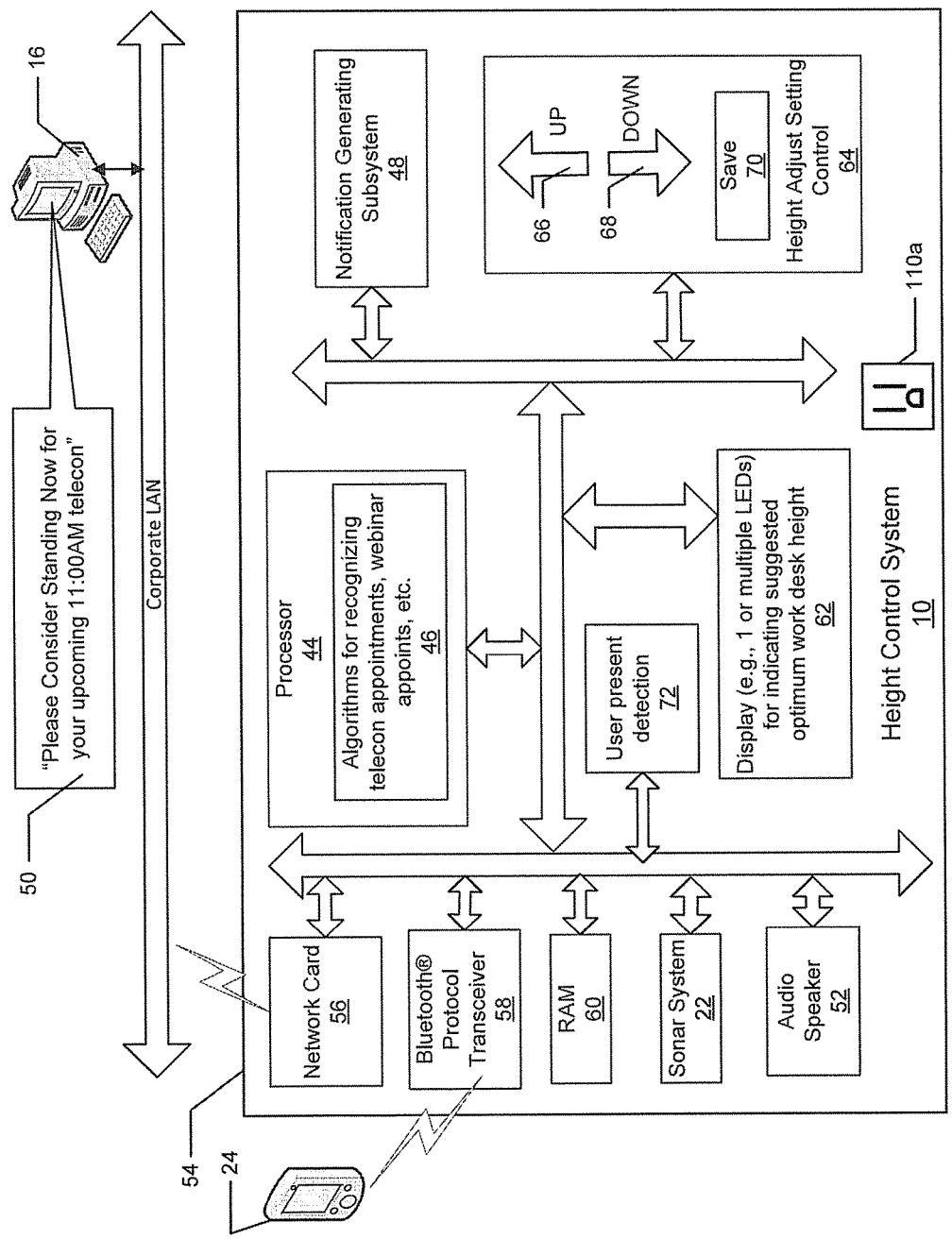
FIG. 2 is a high level block diagram of one embodiment of the height control system shown in FIG. 1.

Referring to FIG. 2 the system 10 one example of the construction of the system 10 is shown. AC power may be provided to the system via a conventional AC outlet jack 10a. DC power from a suitable battery could alternatively be used to power the components of the system 10. In addition to the sensor 22, which is illustrated in this example as a sonar sensor, the system 10 may include a processor 44 with suitable on-board or off-board memory for storing algorithms 46 for recognizing key words on the user's calendar. The key words may be, for example, "webinar", "teleconference", "videoconference", "WebEx", etc., or any other word that indicates an activity that may potentially be performed easily while standing. The processor 44 may use the results of the algorithms to detect and suggest to the user when standing would be possible for an upcoming appointment, and to provide a notification 50 of such via a notification generating subsystem 48. The notification may be pushed on to the user's display system associated with his/her computer system 16. Alternatively, a pre-recorded message may be played through an audio speaker 52 housed within a cabinet or housing 54 of the system 10.

The system 10 may also have a network card 56 for communicating with the corporate LAN 26, a short range, wireless protocol transceiver 58 (e.g., Bluetooth® protocol transceiver, ZigBee® protocol transceiver, etc.), a random access memory (RAM) 60 for storing different preset heights by different users, and a display 62 (LED or LCD) for indicating to the user when the desk surface 12 is at a predetermined height during a raising or lowering action of the desk surface. In one embodiment a plurality of LEDs may be used, or alternatively a multi-colored LED, which provides different optical signals to the user (e.g., green light, yellow light, red light) as the desk surface 12 is being raised or lowered to indicate to the user how close the user is to his/her preset height. Providing a green optical signal may indicate to the user that the desk surface is at exactly the preset height, while a yellow light may signal to the user that the desk surface 12 height is within an inch or two of the present height, and the red light may signal that the desk height is well outside of its preset height. These height indicating signals may be provided when the desk surface is being raised or lowered, to thus indicate to the user when the desk surface 12 reaches a preset elevated height or when it reaches a preset lowered height.

A height adjust setting control 64 may be included in the system 10 for enabling the user to save lowered and elevated heights for the desk surface 12. An "UP" control may be pressed by the user after the desk surface 12 is positioned at a desired height by the user, and then a "SAVE" control 70 may be pressed which saves the elevated height in memory. Alternatively, these different height settings could be saved using a suitable software application running on the computing device which is present on the desk surface 12. Such a modification would require the system 10 to output signals indicative of saved height positions to the computing device. It is also possible that the height settings could be communicated to and saved on a personal electronic device of the user such as a smartphone or computing tablet, using a wireless near field communications link (e.g., Bluetooth® protocol or ZigBee® protocol wireless link). Such a modification would require suitable height position signals to be sent from the system 10 to the user's smartphone or tablet, and then recalled by the system 10 to aid the system 10 in determining the saved height positions for a specific user, provided the user's smartphone or tablet is proximity to the system 10, with the required software application running on the smartphone or tablet.

During the process of raising the desk surface 12 to the desired height, the sonar sensor 22 will be providing signals to the processor 44 which enable the processor 44 to highly accurately determine the height of the desk surface 12. When the user presses the SAVE 70 control after pressing the UP control 66, the processor stores this height as a preset elevated height for the desk surface 12 in the RAM 60. Optionally, an identification of the user may be stored as well by using the wireless link with the user's smartphone which identifies the user to the system 10. When the user is lowering the desk surface 12 the sonar sensor 22 is likewise monitoring the real time height of the desk surface and sending signals to the processor 44 which enable the processor to determine the real time height of the desk surface 12. When the user has the desk surface lowered to an optimum height, the user may press the "DOWN" control 68 and then the SAVE control 70, which saves the lowered position of the desk surface 12 in the RAM 60. Thereafter, if the user wants to raise the desk surface 12 from its preset lowered position to the preset elevated position, the user would simply begin lifting the desk surface (if the desk surface is manually adjustable) or engage the appropriate control to cause a motor to begin lifting the desk surface. The display 62 will provide an optical signal to the user as the user gets close to the preset elevated height (e.g., yellow LED being illuminated), and a different optical signal (e.g., green LED being lit) will be provided once the height is at exactly the preset elevated height. Optionally or in addition to the optical signals, a tone may be provided from the audio speaker 52 when the elevated preset height is reached. The same operations may be performed by the system 10 when the desk surface 12 is lowered.

It will be noticed that the user is not required to enter any commands to the system 10 once the lowered and elevated height presets are saved in the system 10. Whenever the user needs to raise or lower the desk surface 12 the user simply starts raising or lowering the desk surface and the system 10 will detect whether the action is a raising or lowering action and notify the user when the proper preset has been reached. Thus, the desk surface 12 can be repeatedly moved between lowered and elevated heights by the user and it will always be repositioned at exactly the appropriate preset height (either for elevated use or lowered position use).

The height adjust setting control 64 may also be modified with the addition of a keyboard which would enable a user to enter a code identifying him/her to the system 10. The processor 44 would store such codes along with the specific presets saved by the user. This option would enable multiple users to use the system without the need for some external means of identifying users to the system 10 (e.g., without a smartphone and its Bluetooth® protocol or ZigBee® protocol wireless link). Once the user has entered his/her code, the system 10 would thereafter use the appropriate presets for that particular user.

Another feature that the system 10 provides is a user detection system 72 that detects the presence of a user at the work desk 14. The user detection system may be either an optical or sonar based subsystem that continuously monitors when the user is present at the work desk, regardless if the user is standing or seated. The user detection system 72 generates appropriate signals that the processor 44 uses to determine if the user is present at the desk surface. During those periods where the user is standing, the processor 44 may transmit information either to the Corporate IT department 28 or to one or more cloud-based subsystems, for example health provider 36 in FIG. 1, which allows the standing time of the user to be logged. This information may be used by the corporate IT department 28 and/or the health provider, or any other connected entity, for purposes of promoting and encouraging the use of the desk 14 in the standing orientation. Such promoting and encouraging may be done through gamification programs implemented by the HR department 34 and/or the health provider 36, or any other entity. But in either event, the user present detection system 72 enables the system 10 to detect those times that the user is actually at the work desk 14 and working while in a standing position.

Figure 3A:
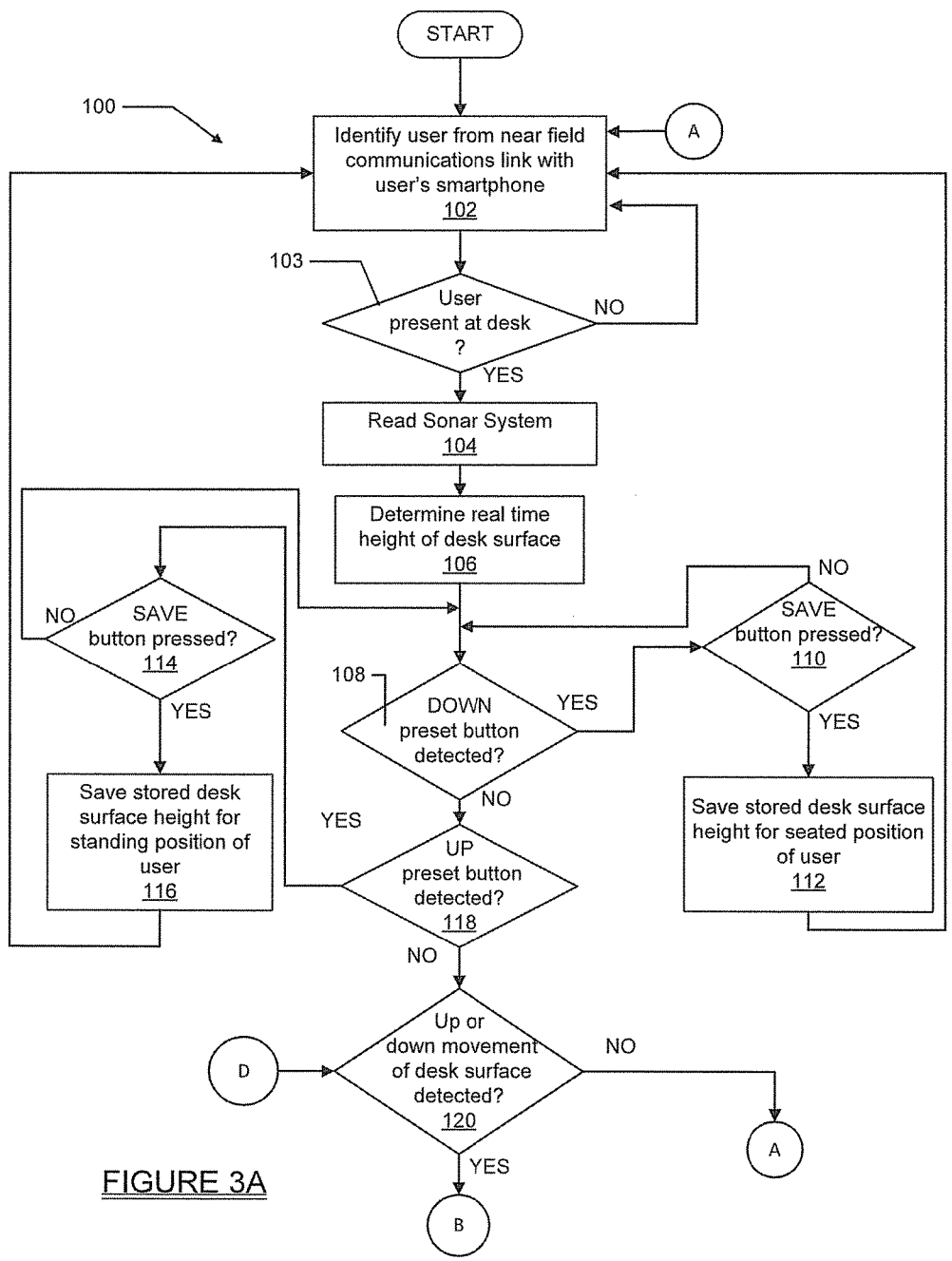
FIGS. 3A and 3B represent a flowchart of various operations that may be performed by the system during use.
Figure 3B:
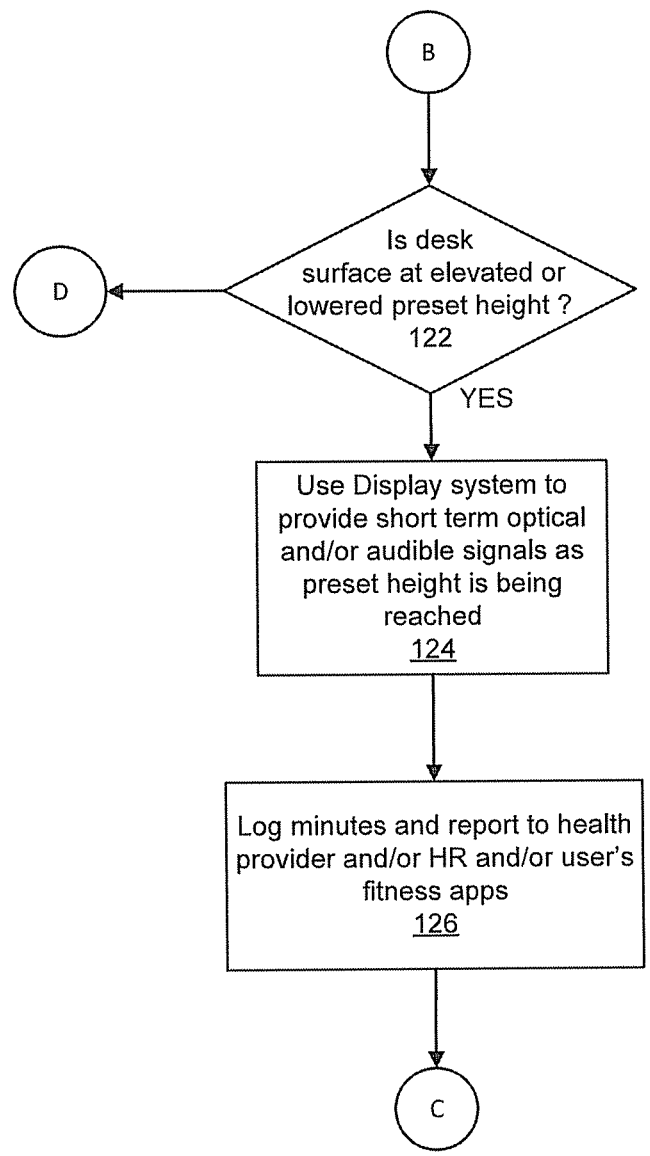

Referring to FIGS. 3A and 3B, a flowchart 100 illustrates various operations that may be performed by the system 100 during use. At operation 102 the system 10 may initially identify the user to the system 10. This may be done by use of the near field communications link (e.g., Bluetooth® protocol or ZigBee® protocol link) with the user's smartphone 24, or possibly by identifying a tablet that the user is carries with him/her.

At operation 103 the system 10 makes a determination by use of the "user present" detection system 72 if the user is actually present at the desk 14. If no user is detected, then operation 102 may be re-performed.

At operation 104 the processor 44 reads or obtains signals from the sonar system 22. At operation 106 the processor 44 determines the real time height of the desk surface 12. At operation 108 a check is made if the DOWN preset control 68 has been pressed, indicating that the user is attempting to program a lowered desk surface height. If the check at operation 108 is produces a "Yes" answer, then the processor 44 checks to determine if the SAVE button 70 has been pressed, as indicated at operation 110, which indicates that a lowered preset desk position is being entered by the user. If the SAVE button 70 has been pressed at operation 110, then the processor 44 saves the lowered desk height for the user in the RAM 60. Similarly, if the test at operation 118 indicates that the UP preset control 66 has been pressed, then the system 10 checks to determine if the user has pressed the SAVE button 70, as indicated at operation 114. If so, then the current elevated height of the desk surface 12 is saved by the processor 44 in the RAM 60, as indicated at operation 116. The saved lowered and elevated desk surface presets may be associated with the particular user, provided the system 10 is constructed to accommodate saving presets for multiple different users.

At operation 120, the system 10 is continually checking, in real time, to determine if the desk surface is being moved from one of its elevated or lowered preset positions. If the check at operation 120 indicates that the desk surface 12 is being moved, then at operation 122 (FIG. 3B) the system 10 determines whether the desk surface 12 is at its elevated or lowered preset height, based on the direction of movement that is detected. By this it is meant that the system 10 detects when the movement of the desk surface 12 is upwardly, and will look for the elevated height preset, and when the movement is detected as being a lowering movement, the system 10 detects when the lowered height preset is reached. At operation 124 the system 10 uses the display 62 to provide optical signals to the user, and optionally the speaker 52 to provide an audible signal as well, to inform the user when the elevated or lowered height preset has been reached. If the system 10 detects that the desk surface 12 has been lowered from its elevated position, the system 10 may then record the previous number of minutes that the desk surface was being used in its elevated position and/or report this usage to the HR department, the user's fitness application(s) and/or a health provider, as indicated at operation 126. If the system 10 detects that the desk surface 12 has just been raised to its elevated position, the system 10 begins logging the minutes that the desk surface 12 is at its elevated position while the user is detected as being present at the desk 14. It will be appreciated that the foregoing operations represent merely one example of how the system 10 may operate, and those skilled in the art will recognize the possibility of various modifications, without departing from the spirit and scope of the present disclosure.

As noted above, the system 10 is easily retrofittable to virtually any existing work desk without modification to the work desk. The sonar sensor 22 may be located within the housing 54, which provides a single component that is placed on top of or mounted underneath the desk 14. Alternatively, the sonar sensor 22 may be a stand-alone, independently mountable component which is linked to the remainder of the system 10 via a suitable electrical cable. This would allow the sonar sensor 22 to be mounted, for example, to the lower surface of the desk surface 12, and the remainder of the system 10 to be positioned on the floor next to the desk 14 or attached to the side of the desk 14. In either implementation, the system 10 can easily be moved from one desk to another if the need arises.

And while the system 10 has been described in connection with a desk 12, it will be appreciated that the system 10 is expected to find use with any type of table that can be raised or lowered to different heights to permit different work operations. As such, the system 10 may be used with assembly tables in a factory environment where different types of assembly operations on goods may require that a table top of an assembly table be positioned at different heights. If the system 10 includes the modification of allowing a user ID code to be entered, then the system 10 would allow the same desk height to be set for different users. This would also enable different users who have to periodically use a given table surface in a manufacturing or assembly environment to quickly and easily set the height of the table surface to a previously saved height. The system 10 may also find potential use in the food service industry, such as in connection with table surfaces used to prepare sandwiches, where different employees having significantly different heights may need to alternately use the same work surface throughout a given day. The system 10 may eliminate the need to have two or more fixed assembly tables at different heights for different assembly operations, or possibly for different users, since the system 10 allows different heights to be set for a given user, and is may be configured to allow for saved, custom height settings for different users.

And while the system 10 has been described as enabling the setting of either a raised height or lowered height (i.e., two different heights), a modification could easily be implemented to enable the system 10 to record three or more heights for a desk or assembly table for a given user/ assembly technician. The use of three or more preset heights is likely to be more advantageous in a manufacturing environment, but nevertheless could easily be implemented by simply providing additional present buttons, similar to the UP control 66 and the DOWN control 68.

Figure 4:
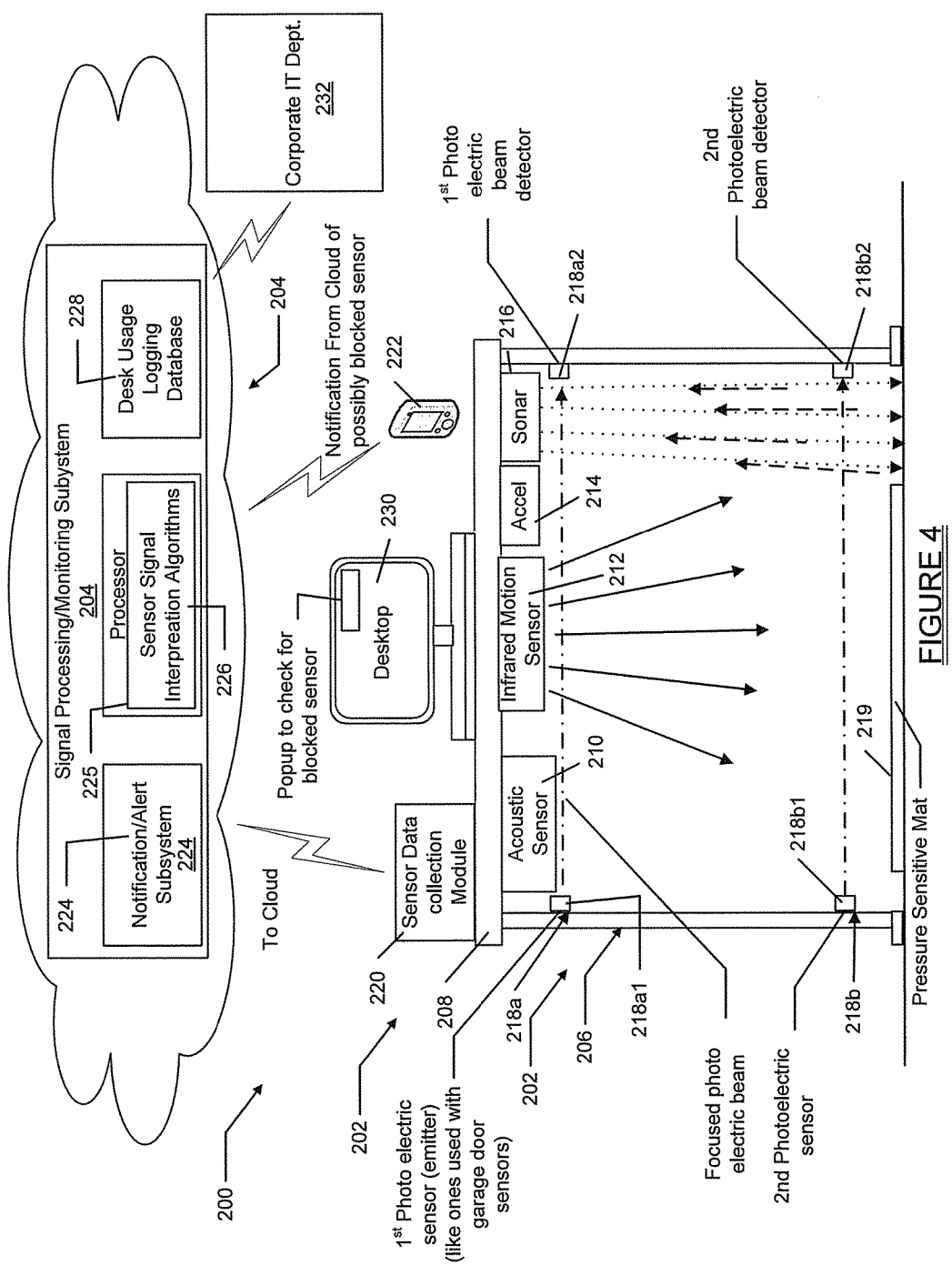
FIG. 4 shows another embodiment of a desk system in accordance with the present disclosure with various sensing subsystems and signal processing subsystems configured to interpret various obtained sensor data to detect if one or more of the sensor systems may be blocked, and to generate an alert notification to the user (e.g., email, text message, etc.)

Referring now to FIG. 4, a desk system 200 is shown which incorporates a vertically adjustable work desk system 202 and a signal processing/monitoring subsystem 204 (hereinafter simply "signal processing subsystem 204"). While the signal processing subsystem 204 is shown as a cloud-based component, it will be appreciated that the signal processing subsystem 204 could instead by integrated into the work desk system 202 itself or located at an IT department work area near the work desk system 202. Thus, the present disclosure is not limited to having the signal processing subsystem 204 located at any particular location.

The work desk system 202 may be similar or virtually identical in construction to the work desk used in connection with the system 10. In this regard, the work desk system 202 may include a plurality of different types of sensing subsystems which are secured to or positioned on various areas of a work desk 206. The work desk 206 is adjustably positionable such that a desk surface 208 may be raised and lowered between a predetermined minimum height and a predetermined maximum height. The sensing subsystems used may include one or more of an acoustic sensor 210, an infrared ("IR") motion sensor 212, an accelerometer 214, a sonar subsystem 216, a plurality of photoelectric sensing subsystems 218a and 218b, and a pressure sensitive floor mat 219, just to name a few of the different types of sensing systems that may be included in the system 200. It is anticipated, however, that with most implementations of the system 200, the sonar subsystem 216, the infrared motion sensor 212 and the accelerometer 214 will be particularly useful and desirable for detecting the majority of situations, during normal use of the work desk 202, where a blocked sensor condition could arise and thus produce spurious sensor signals that would otherwise not be capable of being interpreted by the signal processing/monitoring subsystem 204. The functions of these particular sensing subsystem 212-216 will be discussed in greater detail in the following paragraphs.

The system 200 also may include a sensor data collection module 220 which collects the sensor data obtained by each of the sensor subsystems 210-219, and wirelessly transmits the data to the signal processing/monitoring subsystem 204. Transmission may be either via a local area network, which communications with a wide area network such as the Internet, or possibly by a cellular network. Optionally, the sensor data collection module 220 may include a low power, short range wireless radio system in accordance with the Bluetooth® wireless communications protocol or the ZigBee® wireless communications protocol, or any other suitable protocol, so that a wireless link is established with some other like-configured communications device. Typically a personal electronic device 222 of the user, such as a smartphone or computing tablet, will also be present at the work desk system 202, which provides a means to receive wireless notifications from the signal processing/monitoring subsystem 204 via a commonly used Bluetooth® wireless protocol or ZigBee® wireless protocol communications link.

The signal processing/monitoring subsystem 204 in this example is shown as a cloud-based subsystem, although as mentioned previously, it need not be cloud-based. In this example the signal processing/monitoring subsystem 204 may include a notification/alert subsystem 224, a processing subsystem 225 running one or more sensor signal processing and interpretation algorithms 226, and a desk usage logging database 228. The notification/alert subsystem 224 may be used to transmit notification messages to the user's PED 222 and/or to a computer system 230 positioned on the work desk 206, and/or possibly to a corporate IT department 232, if a blocked or spurious sensor signal is detected from any of the sensor subsystems 210-219. The desk usage logging database 228 collects usage data pertaining to the accumulated time periods that the user has used the work desk system 202 while in the seated and standing positions. This information may be kept for a plurality of users of the work desk system 202 provided there is some identification or log-in procedure that the users use when they begin working at the work desk system 202. If the work desk system 202 is dedicated to one specific user, then no log-in procedure may be needed. In this instance the system 200 assumes that whenever an individual is detected as being present at the work desk system 202, that it will be the same individual using the work desk system in every instance. Collected usage information may be transmitted to the corporate IT department 232, and/or directly to the users PED 222, and/or possibly even to a remotely located third party such as a health/wellness provider, and/or to one or more remotely located (e.g., cloud-based) fitness applications that the user has established. The collected usage data may be provided in any convenient format, and possibly broken down in a variety of ways such as by day, week, month or year. Other data indicating when the work desk system 202 is not in use (i.e., no user detected as being present at the desk system 202) may also be provided. Total usage time during each day, week, month or year could be logged and provided if a plurality of different users are sharing the work desk system 202 each day.

The various sensor subsystems 210-219 may function in various ways to help detect either when a person is present and working at the work desk system 202, or when no individual is present at the work desk system 202. The various sensor subsystems 210-219 may be monitored and their respective signals analyzed by the sensor signal interpretation algorithms 226 to determine, in real time, if one or more of the sensor subsystems 210-219 is blocked or otherwise providing a signal which is outside the bounds of a predetermined signal range, wherein the predetermined signal range indicates normal operating conditions.

The acoustic sensor 210 may monitor sounds in the immediate vicinity of the work desk system 202, for example key actuations on a keyboard, a human voice in the immediate vicinity of the desk system 200 (e.g., within 3-4 feet of the work desk system 202), or any other audible sound which might help to indicate that an individual is present at the work desk system 200. These signals from the acoustic sensor 210 may be used together with one or more other sensed signals from other ones of the sensor subsystems 212-219 to verify that the sounds coming from the vicinity of the work desk system 202 are in fact sounds associated with a person working at the work desk system.

For example, when the infrared motion sensor 212 is detecting that an individual is present in front of the work desk 206, and the audible sounds picked up by the acoustic sensor 210 suggest the same fact, then a reliable determination can be made that, in fact, an individual is actually present at the work desk system 202. In this regard it is preferred that the acoustic sensor 210 have a directional pickup pattern so that it can be "tuned", when it is physically secured to the work desk 206, to "look" in a specific direction for sounds, and more preferably to look toward the area where the individual would be seated or standing, or possibly toward the keyboard of the computer system 230.

The sonar subsystem 216 is expected to be an important sensing mechanism for sensing the height of the desk surface 208, as described in connection with the system 10 in FIG. 1. The sonar subsystem 216 senses a real time height of the desk surface 208 using reflected sound waves. The sonar subsystem 216 may periodically emit acoustic pulses, for example, every 10 ms-500 ms (or at any other suitable frequency), to determine the real time height of the desk surface. The accelerometer 214 may be used in connection with the sonar subsystem 216 to determine if the desk surface 208 is being moved while desk height sensing is occurring. In this instance, the signal processing/monitoring subsystem 226 may analyze both signals from subsystems 214 and 216 and determine that what appears to be a spurious signal from the sonar subsystem 216 is not the result of any blockage or physical item affecting operation of the sonar subsystem 216, but rather simply the result of movement of the desk surface 208, possibly by the user adjusting the height of the desk surface or moving it from its fully lowered position to its fully raised position. This determination may be further verified by looking at the signal from the infrared motion sensor 212. If the infrared motion sensor 212 is indicating that an individual is present in front of the work desk 206, that fact would further verify that a height adjustment is being made. Alternatively, if the sonar subsystem 216 is indicating movement of the desk surface 208 but the accelerometer 214 is indicating that no movement of the desk surface is occurring, this could be interpreted as the user sliding some object under the desk surface 208. Thus, any signals from the sonar subsystem 216 which indicate movement of the desk surface is occurring, while the accelerometer is at the same time indicating that the desk surface 208 is stationary, may be understood as some external item being moved or otherwise positioned under the desk surface 208. The pressure sensitive floor mat 219, on which the user would be standing or seated in a chair, could also be used to help indicate or verify the presence of an individual in front of the work desk 206.

Referring further to FIG. 4, one or both of the photoelectric sensor subsystems 218a and 218b could optionally be incorporated to further provide signals which indicate if some external item (box, briefcase, laptop case, backpack, etc.) has been placed under the desk surface 208 in a position that would interfere with proper sensing by the sonar subsystem 216. Each of the photoelectric sensor subsystems 218a and 218b includes an optical transmitting element 218a1 and 218b1, respectively, and an optical receiving element 218a2 and 218b2, respectively. Sensor elements 218a1/218a2 may be located just below the desk surface 208, while sensor elements 218b1/218b2 are located just above a floor surface. If the signals from either photoelectric sensor element pair 218a1/218a2 or 218b1/218b2 indicate a blockage, this information could be used together with the signals from the sonar subsystem 216 to determine if the real time signals from the sonar subsystem are in fact accurately indicating the real time height of the desk surface 208. For example, if someone sets a box with a flat upper surface directly under the sonar subsystem 216, at least a small chance exists that the signal output from the sonar subsystem may indicate an erroneous height of the desk surface 208. A small box that reflects only a minor portion of the acoustic waves generated by the sonar subsystem may generate a signal which appears spurious or noisy (i.e., not linear as would be expected from a valid sensor reading from the sonar subsystem 216), and thus the spurious or noisy signal, by itself, may be sufficient to detect that some form of item is interfering with proper height detection by the sonar subsystem 216. In either event, the sensor signal interpretation algorithms 226 would be used to analyze the signals from the sonar subsystem 216, and if needed, would also use information from the accelerometer and/or the photoelectric sensors 218a/218b to determine if some obstacle is present which is interfering with proper sensing of the height of the desk surface 208.

As another example, the sensor signal interpretation algorithms 226 could be constructed to look at whether the desk surface 208 height has changed at the moment that a signal from the sonar subsystem 216 changed or became spurious in nature. If no movement of the work desk 208 height has occurred, but the sonar subsystem has suddenly begun indicating a different height or has suddenly began producing a spurious signal (i.e., a signal outside a normal operating range or noisy in nature to the degree of being indeterminable), then this collection of circumstances could be reasonably assumed to indicate that the user has suddenly slid some object (backpack, box, etc.) under the desk surface 208 and blocked the sonar subsystem 216. Still further, an instantaneous rate of change of the sonar signal, as analyzed using the sensor signal interpretation algorithms 226, from a first level to a second level, which would be greater or less than a rate of movement of the desk surface 208 produced by a motor associated with the desk surface 208, could also indicate that the received signals from the sonar subsystem 216 are indicating that something has been quickly slid under the desk surface 208 by the user.

The sensor signal interpretation algorithms 226 will of course depend on the types of sensor subsystems being used, and the extent to which one wishes to be able to determine exactly what type of abnormal condition is present. While it is expected that the use of the accelerometer 214 and the sonar subsystem 216 will cooperatively be able to detect the great majority of abnormal conditions, the use of one or more other ones of the sensor subsystems 210, 212, 218 and 219 may help to even further verify or explain the signals being collected from the sonar subsystem 216.

Referring to FIG. 5, a waveform is shown to illustrate various conditions that the sonar subsystem 216 can be used to detect. As noted previously, the sonar subsystem 216 may emit acoustic pulses at a predetermined frequency and for a predetermined duration. The frequency of the pulses may vary to best a specific sonar sensing subsystem being used. Dashed line 250 indicates a signal magnitude in accordance with a predetermined maximum height of the desk surface 208, and dashed line 252 indicates a signal magnitude in accordance with a predetermined minimum height of the desk surface 208. Thus, any signals that fall within these two limits may be presumed to represent a valid height of the desk surface 208, as long as the signals are "clean" signals, as will be explained further below.

The waveform pulses 254 may be viewed as "clean" pulses because they have a consistent pulse profile (e.g., in this example a good square wave profile), and they indicate the desk surface 208 being at its predetermined upper height limit. In practice, a long string of pulses 254 would typically be present while the desk surface is stationary at its maximum height, since the pulses are being obtained preferably every 10-500 ms. But for explanation purposes, only two pulses 254 have been shown.

Waveform pulse 256 represents what a pulse may look like which is indicating that the desk surface 208 is at some intermediate height between its maximum and minimum heights. Waveform pulses 258 represent what the pulses would look like if the desk surface 208 is at its minimum height. Waveform pulse 260 represents what a pulse may look like which is obtained while the desk surface 208 is in motion being raised at a uniform, known rate of speed, such as by an electric stepper motor. In this instance, the signal processing system 204 uses the sensor signal interpretation algorithms 226 to recognize that the desk surface 208 is being raised. Waveform pulse 262 represents the desk surface 208 back at its maximum height with a clean pulse wave. Waveform pulse 264 indicates a possible spurious signal condition because the signal magnitude indicated by the pulse is below the minimum height level of the desk surface 208. Thus, one or more successive pulses such as pulse 264 may be interpreted by the sensor signal interpretation algorithms 226 as indicating that some external item (e.g., backpack, box, etc.) is under the desk surface 208 and interfering with proper sensing by the sonar subsystem 216. Waveform pulse 266 also indicates an error condition because the magnitude of the pulse is above the upper predetermined height limit of the desk surface 208 (i.e., relative to the ground). The sensor signal algorithms 226 would interpret this as some type of error condition. Waveform pulse 268 may or may not represent an error condition. The slope of the waveform pulse 268 on its leading edge indicates a rate of change of the height of the desk surface 208 which is noticeably greater than that seen with the waveform pulse 260. If the desk surface 208 is raised by an electric motor, then the algorithms 226 may determine that the desk surface is being raised faster than what is possible by the electric motor, and thus interpret this condition as an error condition (possibly due to the individual sliding some object under the desk surface 208). Thus, even though the waveform pulse 268 reaches a point which is within the acceptable range (i.e., at its upper limit), the greater than normal rate of change is interpreted by the algorithm 226 as a potential error condition that might be producing an erroneous desk height measurement.

With any of the waveform pulses 264, 266 or 268, the signal processing/monitoring subsystem 204 may use the notification/alert subsystem 224 to send a notification to the user, either to the user's PED 222 or to the computer system 230 in the form of an email or popup, that a situation likely exists where the sonar subsystem 216, or some other sensor subsystem, is potentially blocked by an extraneous item. Upon receiving this message, the user can take the opportunity to double check to make sure that no external objects are blocking sonar subsystem 216 sensing path.

FIG. 6 illustrates waveform pulses 270 that have spurious characteristics (i.e., they do not have clean signal components), and thus are interpreted as representing some type of error condition. In this instance, there may be some rapid but intermittent blocking of the sonar subsystem 216 occurring, possibly due to someone moving objects around under the desk surface 208 or momentarily accessing a power outlet under the desk surface 208, which intermittently obstructs the transmission path of the sonar subsystem. This could be confirmed by looking at the dotted line, which represents the accelerometer 214 output. Since the accelerometer 214 output is unchanged during the two pulses 270, this provides further evidence to the system 200 that the desk surface 208 is actually not moving. And it should also be noted that although the magnitudes of the pulses 270 may be within the predetermined upper and lower limits, the pulses 270, if they continued as shown for a preset time period (e.g., more than 10 seconds), such a condition would result in a notification being sent by the notification/alert subsystem 224 that some possible blockage has occurred relative to the sonar subsystem 216. The specific signal sent to the user's PED 222 or the computer system 230 may be specific as to a certain sensor (e.g., the sonar subsystem 216), and may thus instruct the user exactly where to look for a potential blockage (e.g., a message that reads: "Please Check Under Right Side of Desk for Objects Blocking the Sonar Sensor") or it may simply indicate to the user to make a check for blockages of any of the sensors.

It will be appreciated that the example waveform pulses shown in FIGS. 5 and 6 may vary considerably in shape depending on multiple factors, such as the precise type of sonar subsystem 216 being used. The waveform pulses shown are intended to only be examples of how various characteristics of the waveform pulses can be used by the sensor signal interpretation algorithms 226 to identify various conditions that may indicate a blocked sensor. The quick and reliable detection of those conditions potentially representing a blocked sensor condition, can ensure that the data collected by the system 200 is valid and accurate. The various sensor signals described herein can also be used to reliably detect when a user is physically present in front of the work desk system 202, thus ensuring the accuracy and validity of the collected usage data for the desk system.

Figure 7:
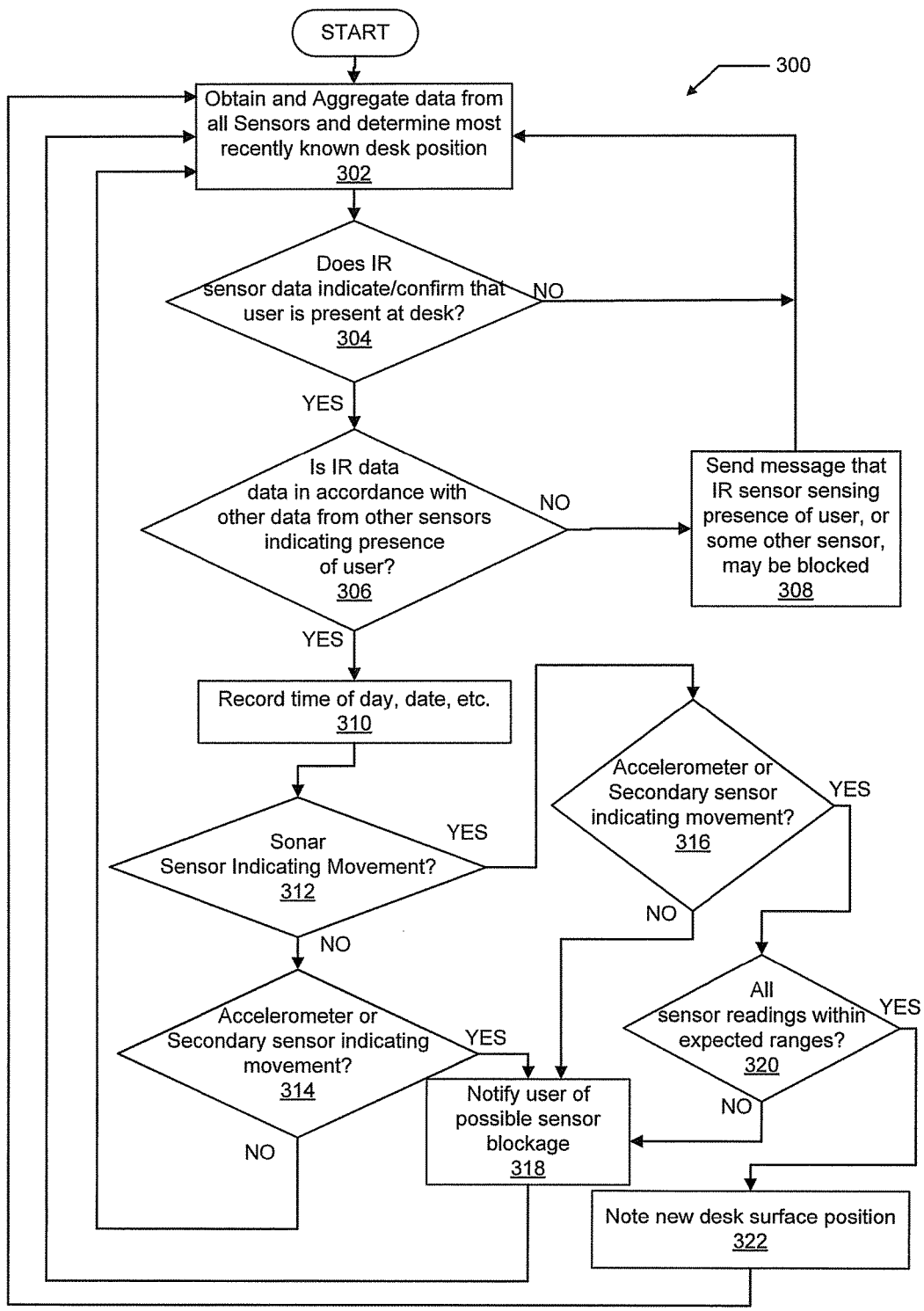
FIG. 7 is a flowchart illustrating one example of various operations that may be performed by the system of the present disclosure.

Referring to FIG. 7, a flowchart 300 is shown to illustrate one example of how the system 200 uses the various sensor subsystems 210-219 to reliably detect that an individual is present at the work desk 206, and whether or not one or more sensors may be blocked. Initially at operation 302, the system 200 obtains and aggregates data from some or, more preferably, all of the sensors 210-219, and uses this information to determine the most recently known desk surface 208 position. The most recently known desk surface 208 position will in most instances be the position the desk surface of the work desk 206 is presently at. At operation 304 the signal processing/monitoring subsystem 204 determines if the data from the infrared motion sensor 212 confirms that the user is present at the work desk 206. If not, then operation 302 is repeated. If the answer at operation 304 is "Yes", then a check is made to determine if the data from the infrared motion sensor 212 is in accordance with other data from other ones of the sensor subsystems 210 and 214-219 (i.e., acting as "secondary" sensor systems). By "in accordance" it is meant whether the data from the infrared motion sensor 212 conflicts with any other sensor data, to thus give rise to an uncertainty as to whether the user is actually present at the work desk 206. If the answer to this inquiry is "No", meaning that a conflict of data exists giving rise to a situation where one or more of the sensors 210-219 may be blocked, then at operation 308 a message may be sent to the user's PED 222 or the computer system 230 by the signal processing/monitoring subsystem 204 that one or more of the sensors may be blocked and to check for blockages. However, if the check at operation 306 produces a "Yes" answer, then at operation 310 the system 200 may record the time of day, date, and any other pertinent information that an entity would like to collect concerning usage of the work desk 206 by an individual.

At operation 312 the signal processing/monitoring subsystem 204 uses the data obtained from the sonar subsystem 216 to determine if the data is indicating movement of the desk surface 208. If the answer to this inquiry is "No", then at operation 314 the data from the accelerometer 214 (or any other secondary sensor able to detect motion of the desk surface 208) is checked to determine if the data is indicating movement of the desk surface 208. If the answer to this inquiry is "No", then operation 302 is repeated.

If the check at operation 312 reveals that the sonar subsystem 216 data is indicating that the desk surface 208 is moving, then at operation 316 the collected accelerometer 212 data is checked to determine if the accelerometer (or some other secondary sensor) is indicating that the desk surface 208 is moving. If the answer to this inquiry is "No", then this indicates a condition where some external object may be interfering with the sensing being performed by the sonar subsystem 216. At operation 318, the signal processing/monitoring subsystem 204 then sends a message to the user to notify the user of a possible sensor blockage condition.

If the check at operation 316 produces a "Yes" answer, indicating that the data from the accelerometer 212 or some other secondary sensor is indicating movement of the desk surface 208, then a check is made at operation 320 to determine if all of the sensor readings are within the expected ranges. If the check at operation 320 produces a "No" answer, then this indicates that some other secondary sensor data is not within a normal range. In that event a signal is sent by the signal processing/monitoring subsystem 204 to the user to notify the user of a possible sensor blockage condition, as indicated at operation 318. If the check at operation 320 indicates that the other secondary sensor data is/are all within an expected range(s), then the new desk surface 208 position is noted at operation 322 (i.e., recorded by the signal processing/monitoring subsystem 204), and operation 302 is repeated. Again, it will be appreciated that the operations and checks performed in FIG. 7 are carried out in real time using sensor data collected in real time.

Figure 8:
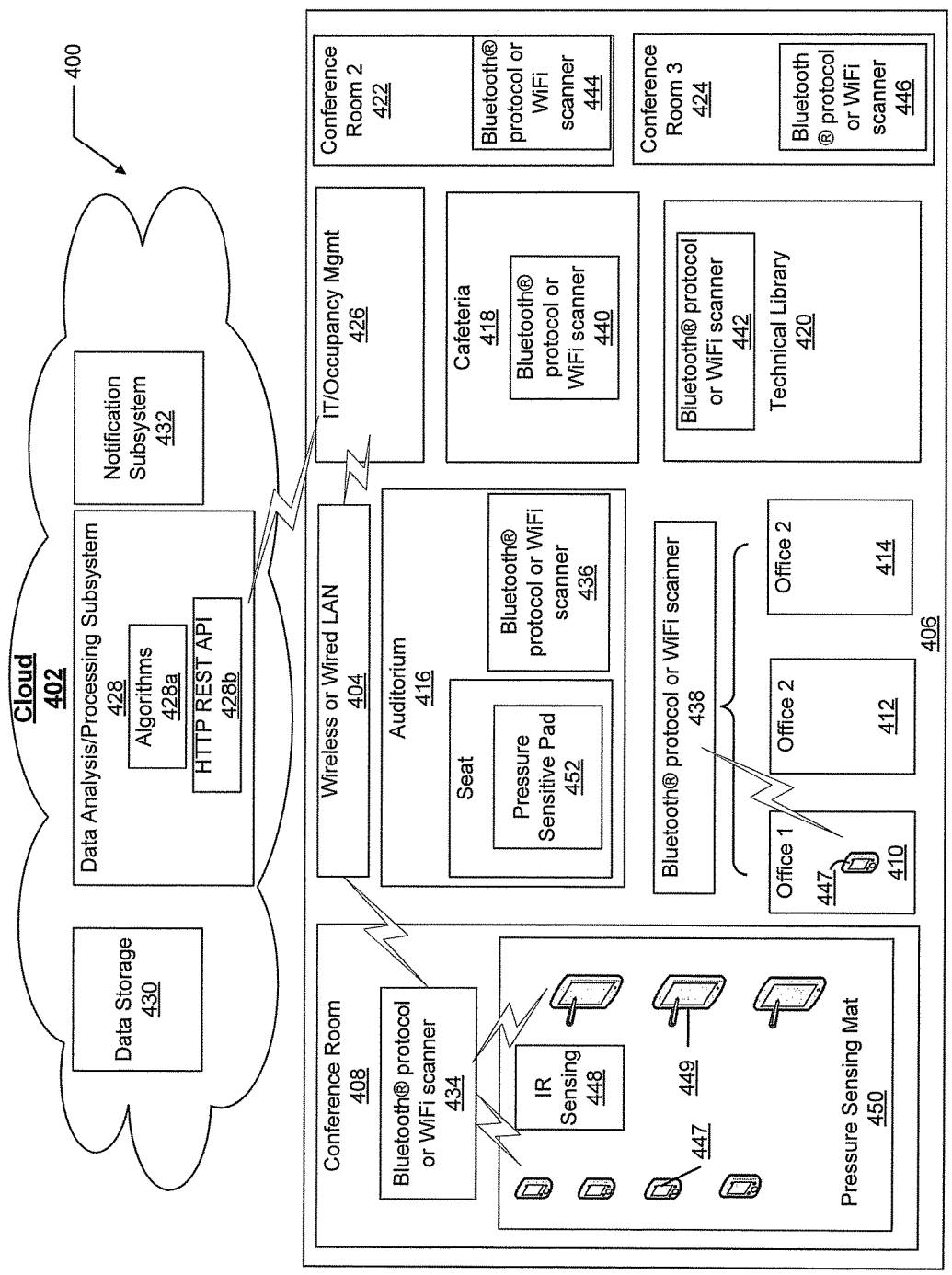
FIG. 8 is a high level block diagram of a real time occupancy detection and monitoring system for use in a building, in accordance with one embodiment of the present disclosure.

Referring now to FIG. 8, a real time occupancy detection system 400 is shown in accordance with one embodiment of the present disclosure. The system 400 in this example includes a cloud-based subsystem 402 which is in communication with a wireless or wired LAN 404 at a building 406. The building 406 may be an office building, a technical center building, or virtually any other type of building. Alternatively, the building 406 may represent a collection of separate and independent buildings on a campus like environment. For simplicity, building 406 is shown as a single building in FIG. 8, although it will be understood that the system 400 is equally well suited to be implemented in a multi-building environment.

The building 406 in this example includes a first, large conference room 408, a plurality of individual offices or cubicles 410-414, an auditorium 416, a cafeteria 418, a technical library 420, and a pair of smaller conference rooms 422 and 424. An information technology (IT) management subsystem 426 is in communication with the LAN 404 as well as the cloud-based subsystem 402. The cloud-based subsystem 402 may include a computer implemented data analysis/processing subsystem 428 which communicates with both a data storage subsystem 430 (e.g., database), and a notification subsystem 432.

It will be appreciated that the number of different types of rooms in the building 406, and the types of rooms themselves, is merely intended to be one example of the various types of rooms that the system 400 may be used to monitor for occupancy purposes. In actual practice, the building 406 may be a large, sprawling building where, for example, the large conference room 408 and the smaller conference rooms 422 and 424 are separated by several hundred feet or more distance, or possibly on different floors. As such, it is not necessarily practical for user's to simply walk over to one of the conference rooms to verify that it is empty and available for immediate use.

The system 400 makes use of one, but more preferably a plurality of scanners 434-446 which may be disposed either in a given room or adjacent to it. Each scanner is adapted to scan for a wireless signal which is typically broadcast by present day personal electronic devices 447 such as smartphones, computing tablets 449, and laptops, just to name a few. Typically these personal electronic devices include a short range, low power wireless communications system, for example a Bluetooth® protocol radio or WiFi communications system, which when turned on continuously broadcasts an identification code making its presence known to other wireless systems in the immediate vicinity. The scanners 434-446 need to be located in reasonably close proximity (e.g., typically within 50-100 feet) of the device 447 or 449 to be able to receive the low power wireless signal. So in this example, the scanner 434 is placed in the large conference room 408, preferably at a central location in the room (e.g., in the ceiling at a central area of the room). Similarly, the auditorium may include a single scanner 436 located therein, or possibly two or more scanners, depending on the size of the auditorium. However, offices 410-414, which are relatively small work spaces, and which are located closely adjacent one another, may be monitored by the single scanner 438. In this example the cafeteria 418 and the technical library 420 also each include one dedicated scanner 440 and 442, respectively. The smaller conference rooms 422 and 424 also each include a single dedicated scanner 444 and 446, respectively. In any event, the scanners report the received identification information to the LAN 404. Optionally, these scanning devices could communicate directly with a cellular modem (3G, LTE, etc.), thus bypassing the need for a local area network connection in the room where the occupancy data is being collected.

The system 400 also may involve using custom applications loaded onto the personal electronic devices (e.g., smartphones, computing tablets, laptops, etc.) which is intended to broadcast explicit notifications either to the cloud-based subsystem 402 or to the Bluetooth® protocol scanners (or WiFi scanners). This may be required if the device being used by the end user does not regularly broadcast identification information, or it has its Bluetooth® protocol radio (or Wi-Fi) disabled. This custom application may also detect which room the user is in by searching for BLE (Bluetooth® protocol enabled) beacons or WiFi access points. Alternatively, other strategies may be implemented as well to address this condition. For example, a situation may exist where the user device does not broadcast anything, even if its Bluetooth® protocol radio (and/or WiFi) is/are enabled. This is a decision made by the manufacturer of the device. If this is the case, then an application could be loaded onto the user's device that would explicitly broadcast an identifier that the Bluetooth® protocol/WiFi scanners would pick up, just as in the other cases described above. The other strategy would be detecting a WiFi access point or beacon, as described above, in order for the user's device (e.g., smartphone/laptop/tablet) to determine its location. This information could then be uploaded to the cloud via WiFi or cellular networks.

Optionally, to provide even further information which can help to gauge the occupancy of a given room or area, a passive infrared sensing system 448, as shown in use in the large conference room 408, may be included. The passive IR sensing system 448 may also communicate wirelessly or via a wired connection with the LAN 404 to provide additional information which confirms the presence of one or more individuals in conference room 408. Still further, an optional pressure sensitive mat 450 may be used in the large conference room 408. The pressure sensitive mat 450 may be large enough to cover all of those areas where chairs are present, for example around a central, large table, such that the presence of individuals seated around the conference table can be sensed. Similarly, in the auditorium 416, each seat therein may use a separate pressure sensitive pad 452 which transmits a wireless (or possibly wired) signal to the LAN 404. It will be appreciated, however, that the IR sensing system 448, the pressure sensitive mat 450 and the pressure sensitive pad 452 are not essential to the system 400, but still can provide additional information that may be helpful in certain situations to determine how efficiently the various rooms within a building are being utilized. The pressure sensitive mat 450 and pad 452 may each be conventional pressure sensitive mats that generate a signal when a threshold force is exceeded (e.g., 25 pounds).

In operation, the system 400 receives real time information from each of the scanners 434-446, as well as the IR sensing system 448 and pressure sensitive mat 450 if these two systems are being used as part of the system 400. The information collected by the scanners 434-446 is analyzed using one or more suitable algorithms 428a to determine with reasonably close certainty the number of occupants in each room or area of the building 406. This occupancy information may be stored in the data storage subsystem 430 and segmented by time of day, such as by 30 minute intervals. This established an historical record of the occupancy of each room for each 30 minute interval. Of course, shorter or longer time intervals could be established, but in any event an historical record is created which is expected to be valuable to the entity associated with the building for determining how effectively the various rooms within the building are being utilized. Still further, pressure sensitive mats could be used at entrances and exits to various rooms or areas of each building to help "count" people entering and leaving, similar to the car counters that consist of a pressure sensitive rubber tube stretched across a road, which senses when a vehicle drives over it.

Once the analysis of the occupancy data reported from the scanners 434-446 is analyzed using the algorithm(s) 428a, the resulting occupancy information may be passed directly to the IT/Occupancy management system 426. This may be accomplished by exposing the information (i.e., occupancy data) over a secure (or optionally public) cloud-based application programming interface ("API") 428b that the IT/Occupancy management 426 can access. Traditionally this API 428b may be an HTTP REST API, but this is not a requirement. The API 428b allows any third party application to make use of the occupancy data and make decisions based on how full a given room is (or may even just check if a room currently has people in it or not). Optionally, this information may also be fed back to HVAC and lighting control systems to control the lighting, or possibly reduce the air conditioning, in those rooms which are detected as being vacant. Still further, the API 428b may include a component which runs in a web browser on a user's portable electronic device (e.g., smartphone, laptop or tablet), in which case the user's web browser will be talking to the cloud-based API 428b.

In addition to the above HTTP REST API 428b, the notification subsystem 432 may operate as an "alert" system to notify third party systems in near real time when certain conditions for each room exist (e.g., a room detected as being completely unoccupied, 25% full, 50% full, 75% full, 90% full, or 100% full). Optionally, this information may be displayed on one or more display monitors at various locations around the building 406. Still further, it is possible that an application may be provided which is loaded onto the personal electronic device (e.g., smartphone, computing tablet, laptop, etc.) of each individual who works in the building. By simply opening the application, each user may be provided with substantially real time information as to the occupancy of various rooms within the building 406. As noted herein, the passive IR sensing system 448 and the pressure sensitive mat 450 and seat pad 452 are not essential for the system 400 to gain a relatively close approximation of the occupancy of a given room. However, for example, situations may exist where an individual attends a meeting in the large conference room 408 while leaving her/his smartphone at a different work area in the building 406. In this instance, of course, the use of the pressure sensitive mat 450 may be able to detect the presence of the individual even though the individual's smartphone is not present with her/him. Another situation may exist where a user brings both her/his smartphone as well as a laptop or computing tablet to a meeting in the large conference room 408. In this instance the use of both the scanner 434 and the pressure sensitive mat 450 may provide information which helps the system 400 to more accurately detect the true number of individuals present in the large conference room 408. Accordingly, by using both the information collected by the scanner 434 and the information provided by the pressure sensitive mat 450, the system 400 may be able to determine with a high degree of certainty an exact count of the individuals present in the room. Optionally, the use of information provided by one or more of the passive infrared sensing systems can be used to detect or to confirm the presence of individuals within a given area (e.g., an outdoor courtyard) where the use of the pressure sensitive mat 450 is impractical.

While the processing of data collected by the system 400 has been described as being handled by the cloud-based subsystem 402, it will be appreciated that this processing and analysis of data could be handled on-site at the building by the entity occupying the building, provided the data analysis/processing subsystem 428 is located at the building.

Figure 9:
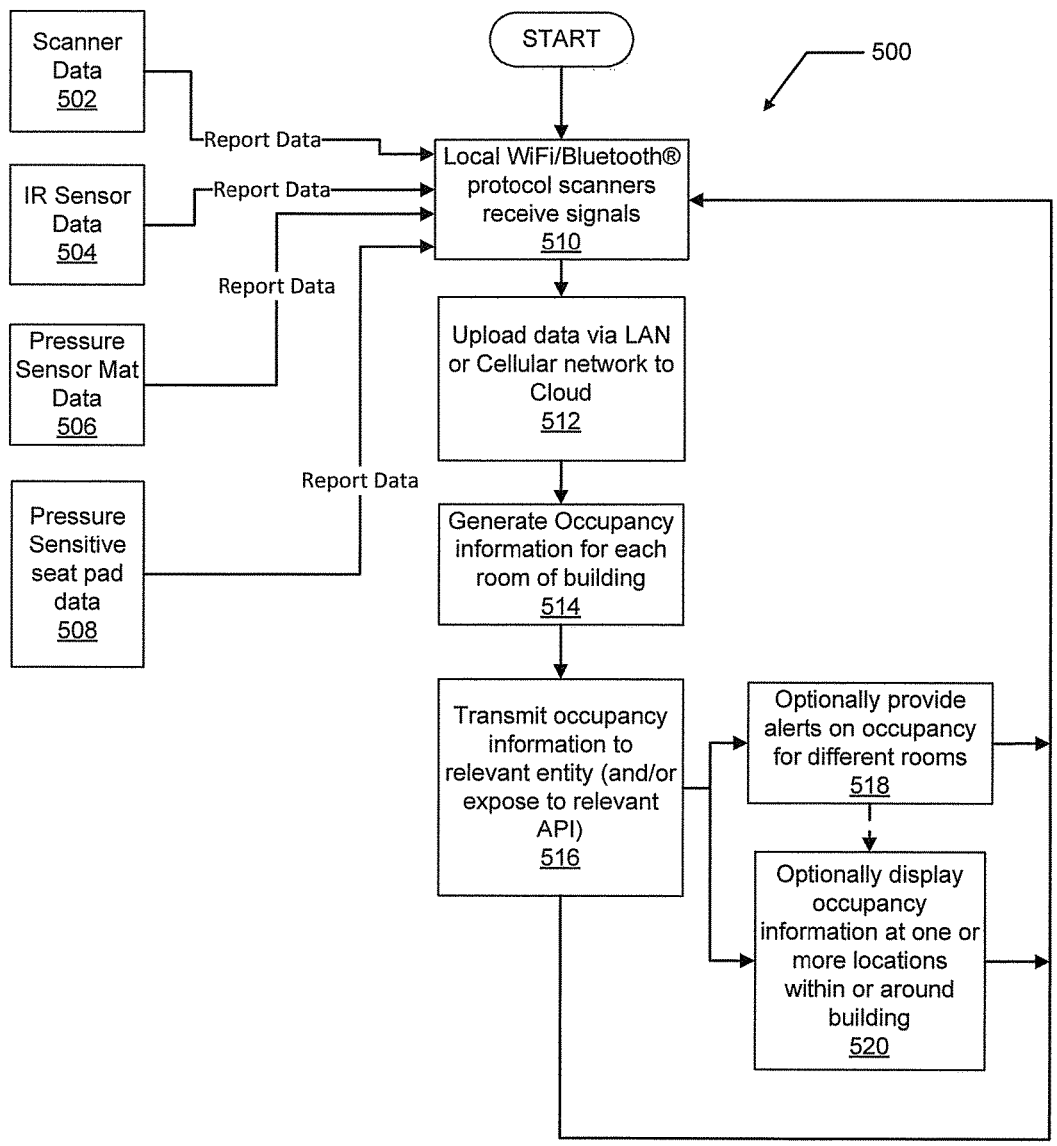
FIG. 9 is a flowchart setting forth various operations that may be performed by the system 400 during its operation.

Referring to FIG. 9, a flowchart 500 represents one example of various operations that the system 400 may perform. Initially data is generated by the various scanners 434-446 and the various sensors 448-452 at operations 502-508. This data is then uploaded by the LAN 404 (or 3G or LTE modem) to the cloud 402, as indicated at operation 512, where all the scanner and sensor data is reported to the analysis/processing subsystem 428. At operation 514 the analysis/processing subsystem 428 generates occupancy information for each room of the building 406. At operation 516 the occupancy information is transmitted to the relevant entity (e.g., the IT/Occupancy Management system 426) and/or exposed to a private or public API (e.g., HTTP REST API 428b). Optionally, at operations 518 and/or 520, alerts may be provided concerning the occupancy of specific rooms (e.g., an alert that the large conference room 408 is vacant or full), and/or occupancy information may be displayed on one or more display monitors (e.g., LED or LCD panels) within or around the building.

It will be appreciated that the collection of scanner and sensor information is being performed by the system 400 in real time, and the occupancy information for the various rooms in the building 406 is therefore being provided to individuals in substantially near real time. Individuals needing to use a conference room, cubicle or work area, or seeking to attend a seminar in an auditorium or visit a cafeteria within the building 406 can therefore obtain near real time information on the approximate occupancy of these rooms or areas. Thus, situations where a conference has been booked, but the individuals who originally booked the room have failed to remove the reservation from a central room reservation system, can still be presented with accurate information as to the occupancy/availability of the conference room. The system 400 is expected to significantly improve the utilization of various rooms within a building, regardless if the rooms are all within a single large building or spread out in various buildings on a campus like setting.

While various embodiments have been described, those skilled in the art will recognize modifications or variations which might be made without departing from the present disclosure. The examples illustrate the various embodiments and are not intended to limit the present disclosure. Therefore, the description and claims should be interpreted liberally with only such limitation as is necessary in view of the pertinent prior art.

What is claimed is:

1. A system for monitoring occupancy of one or more pre-defined areas, comprising:
    a scanning subsystem for wirelessly scanning a pre-defined area, using a short range wireless communications protocol,
    to detect a presence of one or more wireless personal electronic devices (PEDs) associated with one or more individuals present in the pre-defined area, each of the PEDs also using the short range wireless communications protocol to radiate wireless signals that are detected by the scanning subsystem;
    a data analysis/processing subsystem for analyzing data generated by the scanning subsystem relating to detected PEDs in the pre-defined area;
    a notification subsystem for analyzing the information relating to an occupancy level of the pre-defined area;
    further comprising at least one pressure sensitive structure used in the pre-defined area and positioned where chairs are expected to be present,
    the pressure sensitive structure configured to transmit at least one of a wired or wireless signal indicating when a sensed threshold force is detected on a chair,
    the wired or wireless signal being used by the data analysis/processing subsystem to verify detection of at least one individual in the predefined area and to distinguish from a situation
    where an implement having a weight less than a weight of an individual, and thus below the threshold, has been set on the chair; and
    a passive infrared sensing system for detecting the presence of an individual in the predefined area, and
    generating a signal in accordance therewith which is used by the data analysis/processing subsystem,
    along with the signal generated by the pressure sensitive structure, to verify the presence of an individual in the predefined area; and
    wherein the data analysis/processing subsystem comprises a cloud based subsystem.

2. The system of claim 1, further comprising a local area network for communicating with the scanning subsystems and communicating information received from the scanning subsystem to the notification subsystem.

3. The system of claim 1, further comprising an IT/Occupancy management subsystem for communicating with the data analysis/processing subsystem.

4. The system of claim 1, wherein the pressure sensitive structure comprises at least one pressure sensitive mat.

5. The system of claim 1, wherein the pressure sensitive structure comprises at least one pressure sensitive pad.

6. The system of claim 1, further comprising a wireless local area network (LAN) disposed in a vicinity of the predefined area for communicating with the scanner subsystem and with the data analysis/processing subsystem.

7. The system of claim 1, further comprising a data storage system in communication with the data analysis/processing subsystem.

8. The system of claim 1, further comprising an application programming interface operably associated with both of the data analysis/processing subsystem and the one or more PEDs, for providing information to the one or more PEDs relating to occupancy of the predefined area or additional predefined areas.

9. The system of claim 1, wherein the data analysis/processing subsystem receives the information generated by the scanning subsystem wirelessly.

10. A system for monitoring occupancy a plurality of pre-defined areas, comprising:
    a scanning subsystem for wirelessly scanning each of the pre-defined areas, using a short range wireless communications protocol,
    to detect a presence of one or more wireless personal electronic devices (PEDs) associated with one or more individuals present in each of the pre-defined areas, each of the PEDs also using the short range wireless communications protocol to radiate wireless signals that are detected by the scanning subsystem;
    a cloud based data analysis/processing subsystem for analyzing data received wirelessly from the scanning subsystem relating to detected PEDs in the pre-defined areas;
    at least one pressure sensitive structure used in the pre-defined area and positioned where chairs are expected to be present,
    the pressure sensitive structure transmitting at least one of a wired or wireless signal received by the scanning subsystem indicating when a sensed threshold force is detected on a chair,
    the wired or wireless signal being used by the data analysis/processing subsystem to verify detection of at least one individual in the predefined area and to distinguish from a situation
    where an implement having a weight less than a weight of an individual, and thus below the threshold, has been set on the chair;
    a passive infrared sensing system for detecting the presence of an individual in the predefined area, and
    generating a signal in accordance therewith which is used by the data analysis/processing subsystem along with the signal from the pressure sensitive structure to verify the presence of an individual at the predefined area;
    a local area network (LAN) in communication with the scanning subsystem for assisting in providing the data to the cloud based data analysis/processing subsystem; and a notification subsystem for analyzing the information relating to an occupancy level in each one of the pre-defined areas.

11. The system of claim 10, wherein the LAN comprises a wireless LAN.

12. The system of claim 10, wherein the notification subsystem is a cloud based notification system.

13. The system of claim 10, wherein the data analysis/notification subsystem includes an application programming interface (API), and wherein each of the PEDs includes a component of the API to enable communication with the data analysis/notification subsystem to obtain occupancy information from the data analysis/notification system.

14. The system of claim 13, wherein the occupancy information provided by the component of the API informs a user as to occupancies in each of the pre-defined areas.

15. The system of claim 10, further including a display system at least one of the predefined areas for presenting information on occupancy of all of the predefined areas.

16. The system of claim 10, wherein the pressure sensitive structure comprises at least one of a pressure sensing mat or a pressure sensing seat pad located in at least one of the pre-defined areas for providing information to the scanning subsystem to help verify a presence of an individual in the at least one of the pre-defined areas.

17. A method for monitoring occupancy of one or more pre-defined areas, comprising:
using a scanning subsystem to wirelessly scan a pre-defined area, using a short range wireless communications protocol,
to detect a presence of one or more wireless personal electronic devices (PEDs) associated with one or more individuals present in the pre-defined area, each of the PEDs also using the short range wireless communications protocol to radiate wireless signals that are detected by the scanning subsystem;
using at least one pressure sensitive structure in the pre-defined area and positioned where chairs are expected to be present,
the pressure sensitive structure operating to transmit at least one of a wired or wireless signal indicating when a sensed threshold force is detected on a chair,
the wired or wireless signal being received by the scanning subsystem and used to help verify detection of at least one individual in the predefined area and to distinguish from a situation
where an implement having a weight less than a weight of an individual, and thus below the threshold, has been set on the chair;
using a passive infrared sensing system the detect the presence of an individual in the predefined area, and to generate a signal in accordance therewith;
using a data analysis/processing subsystem to analyze data generated by the scanning subsystem relating to detected PEDs in the pre-defined area,
as well data represented by the wired or wireless signals transmitted from the pressure sensitive structure and signals from the passive infrared sensing system; and
using a notification subsystem to analyze the information relating to an occupancy level of the pre-defined area;
wherein the operation of using a data analysis/processing subsystem comprises using a cloud based data analysis/processing subsystem to wirelessly scan a pre-defined area; and
the operation of using a notification subsystem comprises using a cloud based notification subsystem.

\* \* \* \* \*